United States Patent [19]

Gellekink et al.

[11] Patent Number: 4,649,395

[45] Date of Patent: Mar. 10, 1987

[54] PULSE RADAR APPARATUS

[75] Inventors: Bernard Gellekink, Ootmarsum; Willem A. Hol, Hengelo, both of Netherlands

[73] Assignee: Hollandse Signaalapparaten B.V., Hengelo, Netherlands

[21] Appl. No.: 601,524

[22] Filed: Apr. 18, 1984

[30] Foreign Application Priority Data

Apr. 20, 1983 [NL] Netherlands ................. 8301382

[51] Int. Cl.$^4$ ............................................. G01S 13/48
[52] U.S. Cl. .................................................. 342/158
[58] Field of Search ............. 343/16 R, 16 M, 125 B, 343/17.1, 5 NQ, 408, 417

[56] References Cited

U.S. PATENT DOCUMENTS 4,532,515 7/1985 Cantrell et al. ............... 343/16 R

OTHER PUBLICATIONS

Ruvin et al., "Digital Multiple Beamforming Techniques for Radar", IEEE Eascon, 1978, pp. 152-162.

Primary Examiner—T. H. Tubbesing
Assistant Examiner—Mark Hellner
Attorney, Agent, or Firm—Robert J. Kraus

[57] ABSTRACT

A pulse radar apparatus is provided with a coherent transmitting and receiving unit with N juxtaposed receiving antennas and N receivers for the reception of echo signals and the processing thereof into two orthogonally phase-detected and digitized video signal components $i_r$ and $q_r$, where $r=0, 1, 2, \ldots, N-1$. A beamformer is provided to derive from these components the orthogonal components $I_k$ and $Q_k$ of the video signal determined jointly by the N receivers in accordance with a receiving beam pattern k corresponding with a specific elevation interral, where $1=0, 1, 2, \ldots, N-1$. The orthogonal components $I_n$, $Q_n$ and $I_{n+1}$, $Q_{n+1}$ supplied through two adjoining beamformer output channels n and n+1, and derived from the video signals $P_n$, $P_{n+1}$ from echo signals of maximum amplitude received from moving targets, are used for determining the deviation ($\Delta\alpha$) of the elevation value $\alpha$, which elevation value corresponds with the center between the receiving beam patterns n and n+1.

6 Claims, 4 Drawing Figures

PULSE RADAR APPARATUS

BACKGROUND OF THE INVENTION

The invention relates to a pulse radar apparatus, provided with a coherent transmitting and receiving unit, including a transmitter and a transmitting antenna for the transmission of radar pulses, and N juxtaposed receiving antennas and receivers connected thereto for the reception of echo signals and the processing thereof. In each of the receivers the respective echo signal is processed into two orthogonally phase-detected and digitised video signal components $i_r$ and $q_r$, where $r = 0, 1, 2, \ldots, N-1$. A beamformer to derives from these components the orthogonal components $I_k$ and $Q_k$ of the video signal determined jointly by the N receivers in accordance with a receiving beam pattern k, corresponding with a specific elevation interval, where $k = 0, 1, 2, \ldots, N-1$, and supplies the orthogonal components $I_k$ and $Q_k$ through the beamformer output channel k.

Such a pulse radar apparatus is known from the Dutch patent application No. 8204616. This application describes the correction of errors in the beamformer output signals, which errors are due to mutual differences in gain and phase shift in the various receivers. These output signals however determine a relatively large elevation interval in which a target is observed. The present invention has for its object to adapt such a pulse radar apparatus to provide a more precise elevation measurement.

SUMMARY OF THE INVENTION

According to the invention, the pulse radar apparatus, as set forth in the opening paragraph, comprises: buffer and switching means for passing the orthogonal components $I_n$, $Q_n$ and $I_{n+1}$, $Q_{n+1}$ supplied through two adjoining beamformer output channels n and n+1, and derived from the video signals $P_n$, $P_{n+1}$ from echo signals of maximum amplitude received from moving targets; and computing means for determining from the passed orthogonal components the deviation in the elevation which corresponds with the centre between the receiving beam patterns n and n+1. That is, two receiving beam patterns are selected, while from the video signals, received through these patterns, the elevation of the target, from which these video signals originate, are determined.

BRIEF DESCRIPTION OF THE DRAWING

The invention will now be explained in more detail with reference to the accompanying figures, of which.

DESCRIPTION OF THE PREFERRED EMBODIMENT

Figure 1:
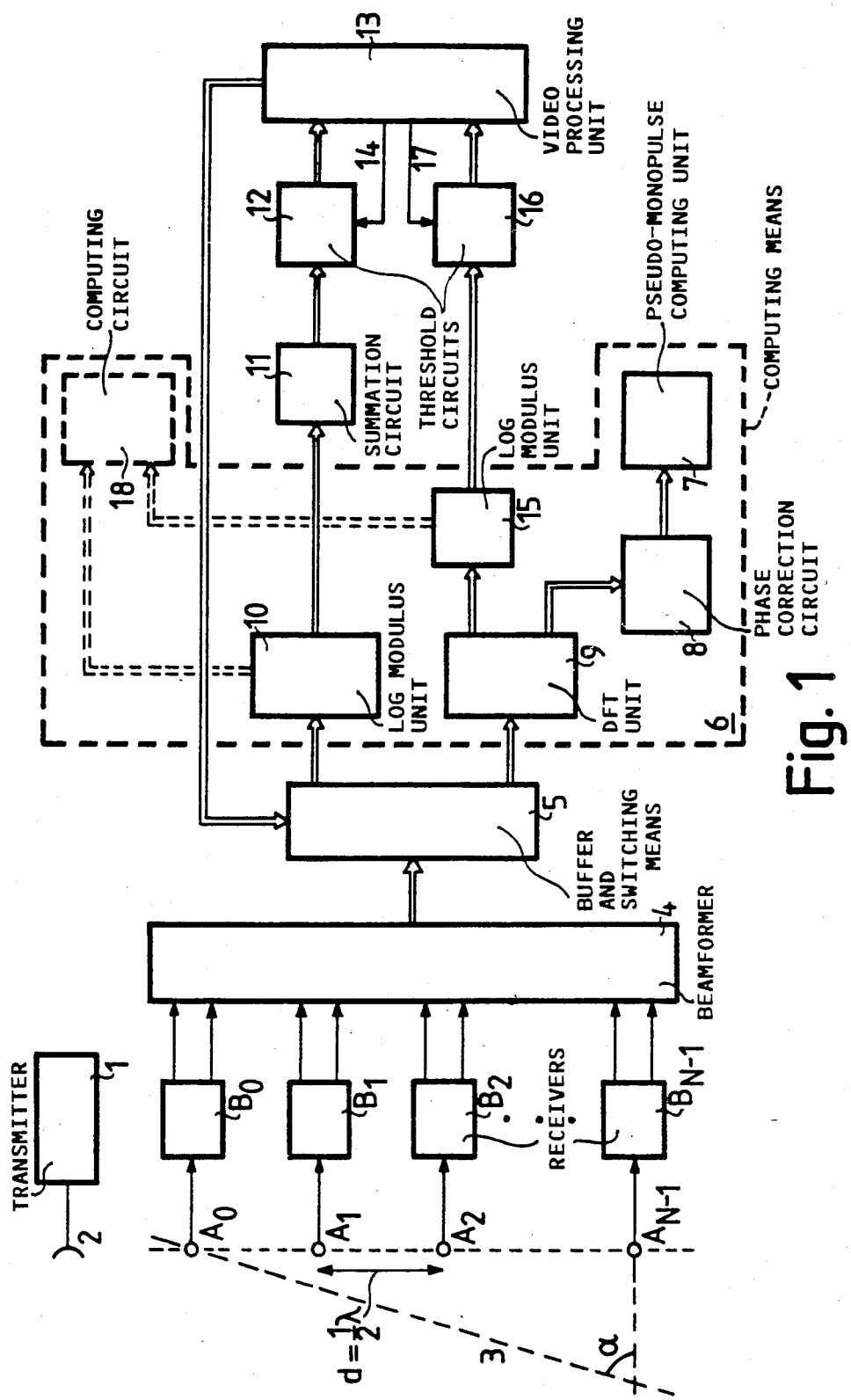
FIG. 1 shows an embodiment of the pulse radar apparatus according to the invention.

The pulse radar apparatus of FIG. 1 comprises a coherent transmitting and receiving unit, including a transmitter 1 and a transmitting antenna 2 for the transmission of radar pulses, N juxtaposed receiving antennas $A_0, A_1, \ldots, A_{N-1}$ and receivers $B_0, B_1, \ldots, B_{N-1}$ connected thereto for the reception of echo signals and the processing thereof in each of the receivers into two orthogonally phase-detected and digitised video signal components $i_r$ and $q_r$, where $r = 0, 1, \ldots, N-1$. If the transmitter signal be denoted by $F(t)\cdot e^{2\pi j f_o t}$, where $f_o$ is the transmitter frequency and $F(t)$ the envelope of the transmitter pulse, the echo signal received by antenna $A_r$ is represented by $$G(t) \cdot e^{2\pi j[(f_o + f_d)t + \phi + f_o \cdot \frac{rd\cos\alpha}{c}]} \quad (1)$$

where $G(t)$ is the envelope of the echo signal, $f_d$ the Doppler frequency, d the mutual distance of the receiving antennas, $\alpha$ the elevation angles under which the wavefront 3 originating from the target is incident on the receiving antennas, c the velocity of light and $\phi$ one of the phase angles dependent on the target range. With $c = \lambda \cdot f_o$ and $d = \frac{1}{2}\lambda$, the echo signal, transformed to intermediate frequency in receiver $B_r$ and coherently phase-detected, can be expressed by:

$$G(t) \cdot e^{2\pi j(f_d t + \frac{1}{2}r\cos\alpha)}; \quad (2)$$

the orthogonal components of this signal are $i_r$ and $q_r$. Receiver $B_r$ supplies these components in digital form. The $i_r$ and $q_r$ values are supplied to a beamformer 4, in which they may be multiplied by a weighting factor $W_r$. The weighting factors form a weighting function proceeding in vertical direction; this function can be applied to effect side-lobe suppression. The beamformer 4 may be of a DFT or FFT design; in the latter case especially if $N = 2^m$, where m is a positive integer. Through output channel k, where $k = 0, 1, \ldots, N-1$, beamformer 4 supplies the $I_k$ and $Q_k$ orthogonal components of the video signal determined jointly by the N receivers, which video signal is proportional to $$G(t) \cdot e^{2\pi j f_d t} \cdot \sum_{r=0}^{N-1} W_r e^{\pi j r(\cos\alpha - \frac{2k}{N})}. \quad (3)$$

With the use of a weighting function which is symmetric with respect to the antenna main direction, where $W_r = W_{N-1-r}$ for $r = 0, 1, 2, \ldots, \frac{1}{2}N-1$, expression (3) can be reduced to $$P_k = G(t) \cdot e^{2\pi j f_d t} \cdot A(\alpha, k) \cdot e^{\frac{N-1}{2} \pi j(\cos\alpha - \frac{2k}{N})}. \quad (4)$$

With the use of a weighting function, where $W_r = W_{N-r}$ for $r = 1, 2, \ldots, \frac{1}{2}N-1$ and $W_0 = 0$, expression (3) can be reduced to $$P_k = G(t) \cdot e^{2\pi j f_d t} \cdot A(\alpha, k) \cdot e^{\frac{N}{2} \pi j(\cos\alpha - \frac{2k}{N})}. \quad (5)$$

where $A(\alpha, k)$ is a real quantity determined by the radiation angle of incidence $\alpha$, the number k of the particular beamformer output channel and the applied weighting function. Thus, each output channel k delivers $I_k$ and $Q_k$ components of a video signal derived jointly by the N receivers in accordance with a specific receiving beam pattern K from the $i_r$ and $q_r$ components of the detected and digitized video signals. Each receiving beam pattern corresponds with a specific elevation interval. The main directions of the various receiving beam patterns are determined by the relationship $$\cos\alpha - \frac{2k}{N} = 0.$$

Figure 2:
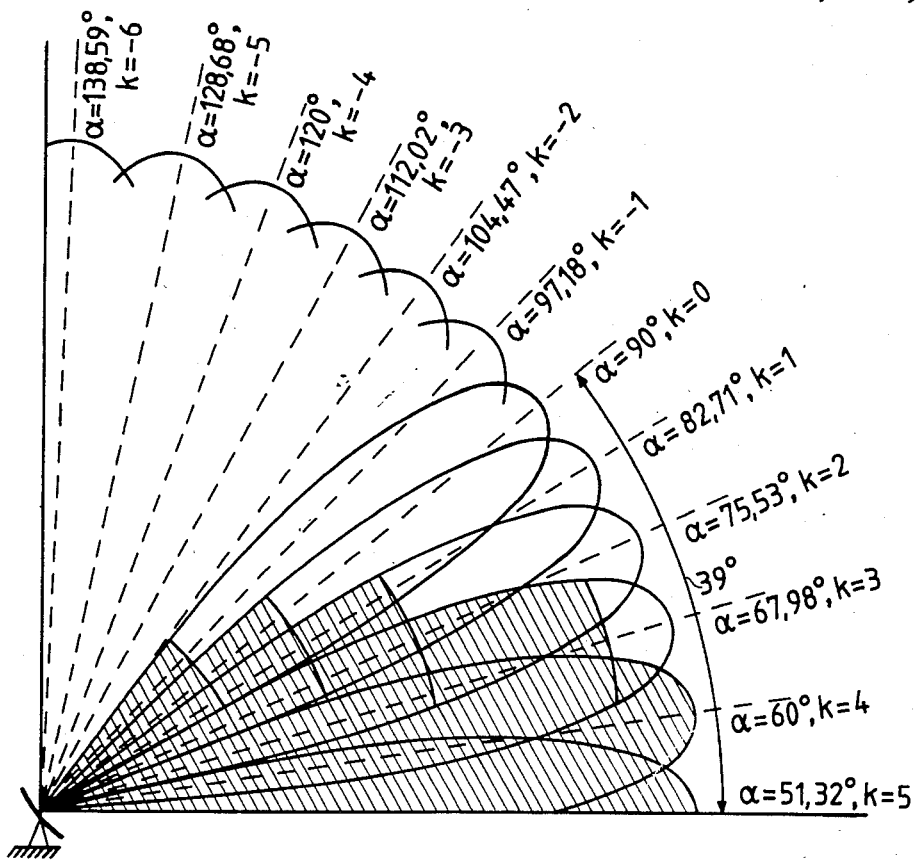
FIG. 2 is a diagram illustrating the receiving beam patterns as determined by the beamformer.

Possible beam directions, which may thus be established, are shown in FIG. 2. If, for example, $N=16$, the main directions of the receiving beam patterns are obtained with $\alpha=0°$, $28.96°$, $41.41°$, $51.32°$, $60°$, ..., $128.68°$, $138.59°$, $151.04°$ and $180°$ for $k=8, 7, 6, 5, 4, \ldots, -5, -6, -7, -8$.

Note that because the complex exponents of expression (3) are periodic with k modulo N, the latter series of k values ($k=8, 7, \ldots, -8$) is equivalent to the former series of k values, where k is an integer ranging from 0 to N. For example, the output channel defined by $k=11$ produces $I_{11}$ and $Q_{11}$ components of a video signal for a target in a receiving beam pattern in the main direction $\alpha=128.68°$ for $k=-5$.

If the antenna system of the pulse radar apparatus is arranged at an angle of, say, 39°, the only receiving beam patterns of concern are those of which the main directions are obtained with $\alpha=51.32°, 60°, \ldots, 138.59°$ for $k=5, 4, \ldots, -6$.

In such a case the main directions are at angles $\alpha-51°$ with respect to the horizontal plane (earth's surface). Therefore, of the 16 beamformer output channels available in this case, only 12 are used.

If beamformer output channel n supplies the components of the video signal whose amplitude is greater than that of which the components are supplied through any other output channel, a target is situated in the elevation interval corresponding with the output channel. Moreover, a more precise indication of the target elevation also requires the selection of the adjoining output channel through which the components of the video signal of the then largest amplitude are supplied; furthermore, these components must be combined with those supplied through output channel n. Thus after selection of the $I_n$, $Q_n$ and $I_{n+1}$, $Q_{n+1}$ components of the video signals, established in accordance with the receiving beam patterns n and n+1, the deviation of the elevation corresponding with the centre between the receiving beam patterns n and n+1 must be determined. The $I_n$, $Q_n$ and $I_{n+1}$, $Q_{n+1}$ components are selected in buffer and switching means 5. Computing means 6 determines the deviation $\Delta\alpha$ of the elevation $\overline{\alpha}$ corresponding with the centre between the selected receiving beam patterns n and n+1. The deviation $\Delta\alpha$ lies within the interval determined by the main beam directions $\alpha_n$ and $\alpha_{n+1}$; if $\Delta\alpha$ were to fall outside this interval, different receiving beam patterns would of course have been selected. The elevation deviation may be determined in computing means 6 in different ways.

Figure 3A:
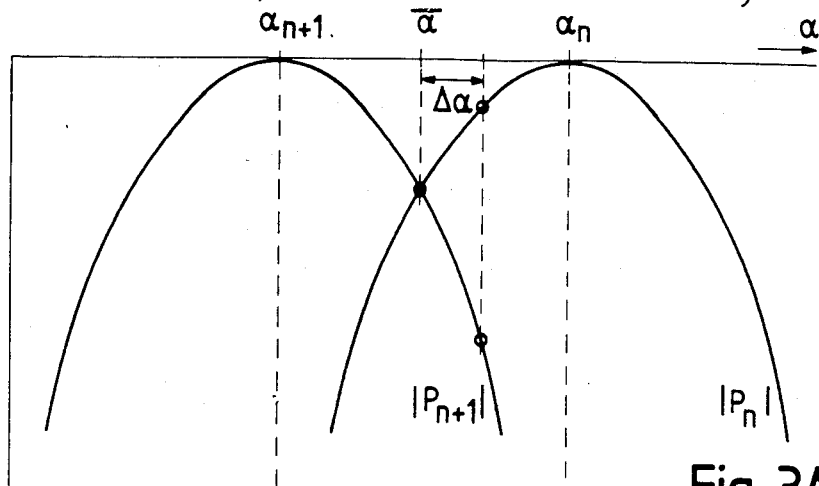
FIGS. 3A and 3B are diagrams illustrating the operation of the pulse radar apparatus.
Figure 3B:
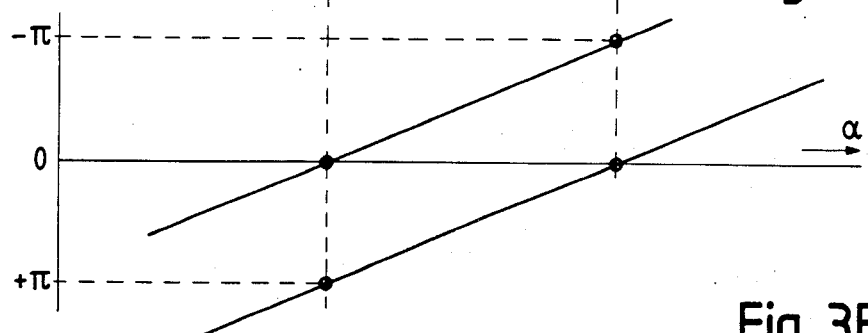

With the use of a weighting function, where $W_r=W_{N-1-r}$ for $r=0, 1, 2, \ldots, \frac{1}{2}N-1$, there is a phase difference of $$\frac{N-1}{N}\pi$$

for all values of $\alpha$ between $P_n$ and $P_{n+1}$, which are defined by relationship (4). With the use of a weighting function, where $W_r=W_{N-r}$ for $r=1, 2, \ldots, \frac{1}{2}N-1$, there is a phase difference $\pi$ for all values of $\alpha$ between $P_n$ and $P_{n+1}$, which are defined by relationship (5). FIG. 3A shows $|P_n|$ and $|P_{n+1}|$ as a function of $\alpha$; FIG. 3B illustrates the phase shift of $P_n$ and $P_{n+1}$ as a function of $\alpha$ in case the latter weighting function is applied.

The deviation $\Delta\alpha$ can be determined by a method comparable with monopulse signal processing, where $\Delta\alpha$ is proportional to the real value of the ratio between the difference signal and the sum signal. Owing to the phase relationship between $P_n$ and $P_{n+1}$, $\Delta\alpha$ is here however inversely proportional to the real value of the ratio between the difference signal and the sum signal, as produceable from the video signals established by the receiving beam patterns. Hence, $$\frac{1}{\Delta\alpha} = C \cdot Re\left(\frac{P_n - P_{n+1}}{P_n + P_{n+1}}\right) = C \cdot \frac{|P_n|^2 - |P_{n+1}|^2}{|P_n|^2 + |P_{n+1}|^2 + 2|P_n|\cdot|P_{n+1}|\cos\phi} \quad (6)$$

where C is a constant and $\phi$ the phase angle between $P_n$ and $P_{n+1}$. If $\phi=\pi$, then $$\frac{1}{\Delta\alpha} = C \cdot \frac{|P_n| + |P_{n+1}|}{|P_n| - |P_{n+1}|}. \quad (7)$$

In practice, this relationship leads practically to the same result as obtained for $$\phi = \frac{N-1}{N}\pi.$$

Nevertheless, in the latter case it is possible to correct the phase of one of the $P_n$ or $P_{n+1}$ signals in such a way that these signals can be subsequently be processed as if there were a phase difference $\pi$ between them.

To implement the above described $\Delta\alpha$ determination, computing means 6 comprises a pseudo-monopulse computing unit 7 for determining $\Delta\alpha$ from the components of the buffer and switching means 5, $I_n$, $Q_n$ of $P_n$ and $I_{n+1}$, $Q_{n+1}$ of $P_{n+1}$, by relationship (7). If desired, the pseudo-monopulse computing unit 7 may be preceded by a phase correction circuit 8, when using a weighting function which implies a phase difference $$\frac{N-1}{N}\pi$$

between $P_n$ and $P_{n+1}$.

In case $|P_{n-1}|$ and $|P_{n+1}|$ show little difference, first the components $I_{n-1}$, $Q_{n-1}$ and $I_n$, $Q_n$ of $P_{n-1}$ and $P_n$ are selected and then the components $I_n$, $Q_n$ and $I_{n+1}$, $Q_{n+1}$ of $P_n$ and $P_{n+1}$. A more precise determination of $\Delta\alpha$ can now be obtained by a combination of the results $$\frac{1}{\Delta\alpha_1} = C \cdot \frac{|P_{n-1}| + |P_n|}{|P_{n-1}| - |P_n|}$$

and $$\frac{1}{\Delta\alpha_2} = C \cdot \frac{|P_n| + |P_{n+1}|}{|P_n| - |P_{n+1}|}.$$

The value obtained for $\Delta\alpha$ will be relatively small and will correspond with an elevation in the vicinity of the main direction determined by $P_n$.

To ensure that the monopulse processing method here described is applied solely to target data and not to the combination of target data and clutter, the selected components $I_n$, $Q_n$ and $I_{n+1}$, $Q_{n+1}$ are filtered through a DFT (Discrete Fourier Transform) unit 9. This unit comprises at least two parallel-operating channels both for the successively supplied values of $I_n$, $Q_n$ and those of $I_{n+1}$, $Q_{n+1}$. If successively supplied $I_n$, $Q_n$ or $I_{n+1}$, $Q_{n+1}$ values are processed for each $N=2^m$, where m is a positive figure, e.g. $N=16$, each channel of the DFT unit functions as FFT unit. It is not necessary however to apply such a clutter filtering for all receiving beam patterns or for complete receiving beam patterns. By way of example, in the shaded region of FIG. 2, covered by the receiving beam patterns, both target data and clutter are established. For the four bottom receiving patterns, separate, parallel-operating FFT channels can be used, while for all the remaining receiving beam patterns it is sufficient to use, say, two parallel-operating FFT channels. Buffer and switching means 5 have the memory capacity required for this purpose.

In the pulse radar apparatus of FIG. 1, computing means 6 further comprises a log-modulus unit 10, connected directly to buffer and switching means 5, for determining the $\log|P_n|$ value preferably for the higher receiving beam patterns only. A number of such values obtained for a certain receiving beam pattern can be summed to obtain an average value for a certain range quant. This summation is performed in summation circuit 11, connected to the log-modulus unit 10. In threshold circuit 12 the average value is compared with a threshold and applied to video processing unit 13. Unit 13 also determines the threshold value applied to circuit 12 via line 4.

For the lower receiving beam patterns, computing means 6 comprises a log modulus unit 15 connected to the DFT unit 9. In this way, the $\log|P_n|$ values are determinable for all channel outputs of the DFT unit 9. These values are supplied to the video processing unit 13 via threshold circuit 16. Video processing unit 13 in turn determines the threshold values applied via line 17, as desired for each of the outputs of the parallel-operating channels. From the output signals of circuits 12 and 16, thus from the log modulus values having passed the threshold, video processing unit 13 derives the control signals, which are supplied to buffer and switching means 5 to make the selection of the output signals from the beamformer 4, that is the $I_n$, $Q_n$ and $I_{n+1}$, $Q_{n+1}$ components with the largest log modulus values for the pseudo-monopulse signal processing, and the $I_n$, $Q_n$ components from the desired receiving beam pattern for the desired DFT channel for the DFT signal processing in circuit 12.

Instead of the pseudo-monopulse computing unit 7, and, if applicable, the phase correction circuit 8, the output signals of the log modulus units 10 and 15 can be used to determine $\Delta\alpha$, as this value is proportional to the difference $\log|P_n| - \log|P_{n+1}|$. In such a case, the units 7 and 8 of FIG. 1 must be replaced by circuit 18 of the computing means, shown dotted and connected to units 10 and 15 by the dotted lines. If with this method no distinction is made between low and high receiving beam patterns and no clutter filter is applied, it suffices to use log modulus unit 10 and circuit 18.

What is claimed is:
1. A pulse radar apparatus comprising:
 (a) a coherent transmitting and receiving unit including a transmitter and a transmitting antenna for the transmissison of radar pulses, a vertical array of N receiving antennas and N receivers connected thereto for the reception of echo signals and the processing thereof in each of the receivers into two orthogonally phase-detected and digitized video signal components $i_r$ and $q_r$, where $r=0, 1, 2, \ldots, N-1$;
 (b) a beamformer including N output channels (k) representing respective receiving beam patterns covering specific elevation intervals, where $k=0, \ldots, N-1$, each output channel being adapted to derive from said components ($i_r$ and $q_r$) the orthogonal components ($I_k$ and $Q_k$) of a moving-target video signal $P_k$ originating from the respective receiving beam pattern;
 (c) a buffer and switching means electrically connected to the beamformer for selectively passing the orthogonal components ($I_k$ and $Q_k$) of each output channel of the beamformer; and
 (d) computing means electrically connected to the buffer and switching means;
 characterized in that:
  (1) the buffer and switching means is adapted to select two adjoining output channels (n and n+1) having orthogonal components ($I_n$, $Q_n$ and $I_{n+1}$, $Q_{n+1}$) of moving-target video signals $P_n$ and $P_{n+1}$ with the maxium available amplitudes, and
  (2) the computing means comprises a pseudo-monopulse computing unit for determining from the selected components of $P_n$, $P_{n+1}$ the deviation in elevation $\Delta\alpha$ with respect to an elevation value $\overline{\alpha}$, which is the bisecting angle between the main beam directions $\alpha_n$ and $\alpha_{n+1}$ of the receiving beam patterns n and n+1, by using the relationship:

$$\frac{1}{\Delta\alpha} = C \cdot Re\left(\frac{P_n - P_{n+1}}{P_n + P_{n+1}}\right)$$

where C is a constant.
2. A pulse radar apparatus as claimed in claim 1, characterised in that the computing means comprises a log modulus unit electrically connected to the buffer and switching means, and a computing circuit for determining the deviation in elevation $\Delta\alpha$ from $\log|P_n|$ and $\log|P_{n+1}|$ values supplied by the log modulus unit.
3. A pulse radar apparatus as claimed in claim 1 or 2, characterised in that a clutter filter comprising of a DFT unit is electrically connected between the buffer and switching means and the pseudo-monopulse computing unit.
4. A pulse radar apparatus as claimed in claim 3, characterised in that the DFT unit comprises p parallel-operating DFT channels, where $p \leq N$.
5. A pulse radar apparatus as claimed in claim 4, characterised in that for each of the lower q receiving beam patterns, a separate DFT channel is provided, and for the remaining N-q receiving beam patterns r DFT channels are provided, where $r < N-q$.
6. A pulse radar apparatus as claimed in claim 5, characterised in that a second log modulus unit is electrically connected to the DFT unit, said second log modulus unit supplying the computing circuit with the $\log|P_k|$ signals for the lower q receiving beam patterns, and said other log modulus unit supplying said $\log|P_k|$ signals for the remaining receiving beam patterns.

* * * * *